June 4, 1968     O. LUTHI     3,386,584

VALVELESS DRUM FILTER

Filed May 5, 1967     2 Sheets-Sheet 1

INVENTOR
*OSCAR LUTHI*
BY
ATTORNEY

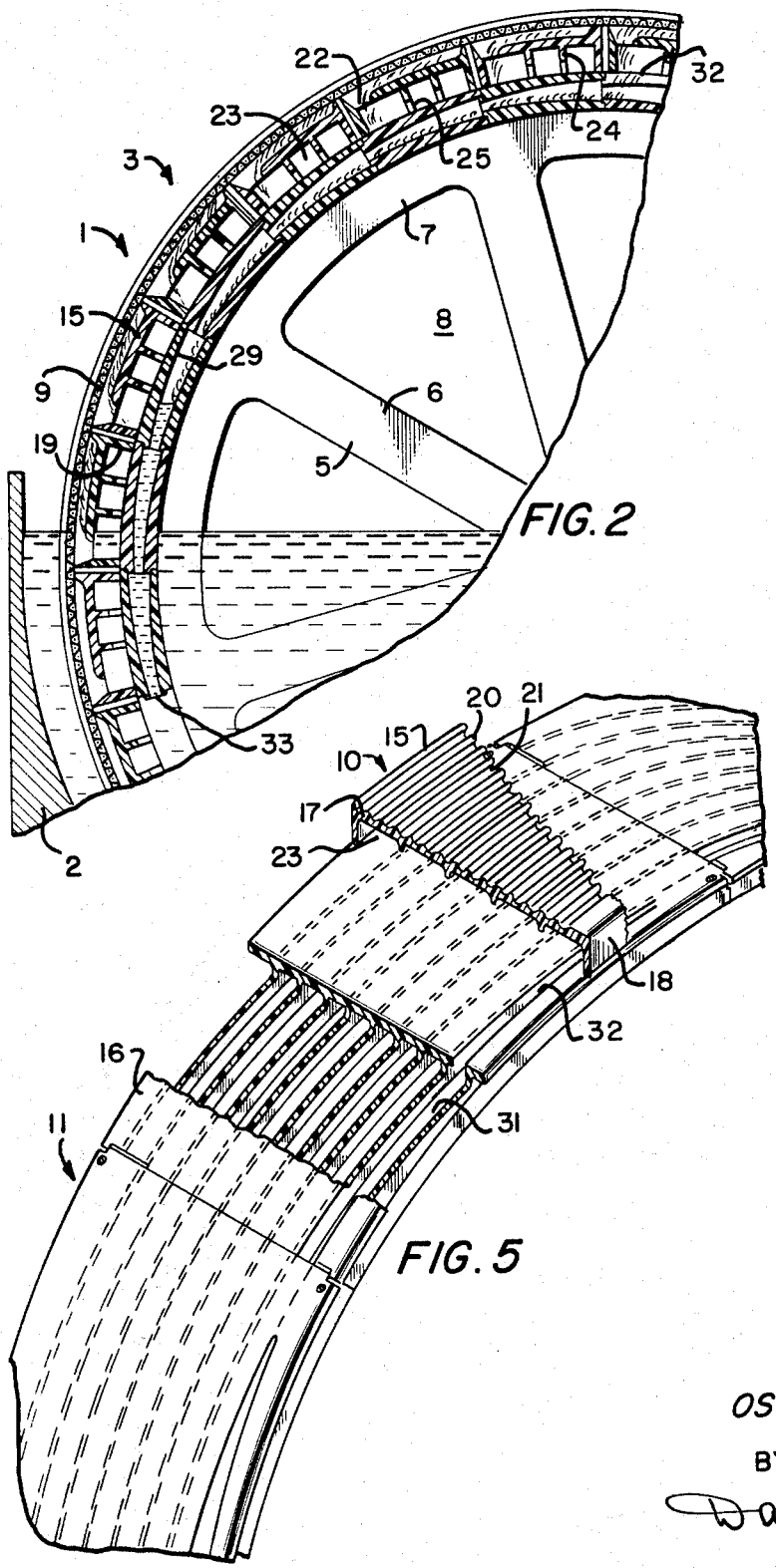

United States Patent Office 3,386,584
Patented June 4, 1968

3,386,584
VALVELESS DRUM FILTER
Oscar Luthi, Hillsborough, N.H., assignor to Improved Machinery, Inc., Nashua, N.H., a corporation of Delaware
Filed May 5, 1967, Ser. No. 636,309
5 Claims. (Cl. 210—404)

ABSTRACT OF THE DISCLOSURE

A valveless rotary drum filter including a plurality of filtrate suction compartments located around the circumference of the drum and connected to individual passageways located inside of the drum for applying a vacuum to the compartments as the drum rotates. The passageways extend arcuately rearward relatively to the direction of rotation of the drum so that filtrate draining from the compartments through the passageways as the drum rises out of its slurry creates a suction in the compartments.

Background of invention

The present invention relates to rotary drum filters and more particularly to a drum filter of the valveless vacuum type.

Valveless vacuum drum filters (of the type disclosed in Patents Nos. 1,816,132 and 2,537,414, for example) operate under a low vacuum head which is internally generated by the rotation of the filter drum. This low vacuum head is created by the use of filtrate passageways bent backward or trailing with respect to the direction of drum rotation. Filtrate drains by gravity from a trailing passageway as the passageway rises from the filter slurry and creates a vacuum or suction behind the draining filtrate. The necessity of providing a drum with a multiplicity of filtrate passageways of substantial angular extent capable of operating at high filter efficiency has proved to be a difficult problem. These problems have increased as drum filters have become larger in diameter and length, due to a continuing desire for larger equipment having a greater capacity.

Summary of invention

A primary object of the present invention is to provide a rotary drum filter of the valveless vacuum type of a novel design which eliminates the need for filtrate to run lengthwise of the filter for a large distance before reaching the filtrate drain passageway.

Another important object of the invention is to provide an improved and more efficient rotary drum filter of the valveless vacuum type which will provide each of a maximum number of drum sectors with an independent passageway and will at the same time provide said passageways with a more efficient shape, construction and arrangement.

In general, these objects are attained in a drum filter including a series of filter elements angularly spaced around its circumference with each filter element forming a filtrate drainage compartment and a series of parallel passages lying under the compartment and extending at an acute angle relative to the rotation direction of the drum. These passages are located side-by-side at equal radial distances from the axis of the drum with one passage being interconnected to the compartment for draining the compartment. Each filter element is connected to adjacent filter elements so that the passages in each filter element are connected to passages in adjacent filter elements to form continuing passageways extending through a series of filter elements and comprising vacuum-forming passageways.

Brief description of drawings

The invention is described in connection with the accompanying drawings wherein:

FIG. 2 is a fragmentary enlarged section taken on the line 2—2 of FIG. 1;

FIG. 5 is a fragmentary perspective view with portions being cut away of a circumferential row of deck sections; and FIG. 6 is a diagrammatic view illustrating the arrangement of the plural passages in a circumferential row of deck sections.

Description of preferred embodiment

Figure 1:
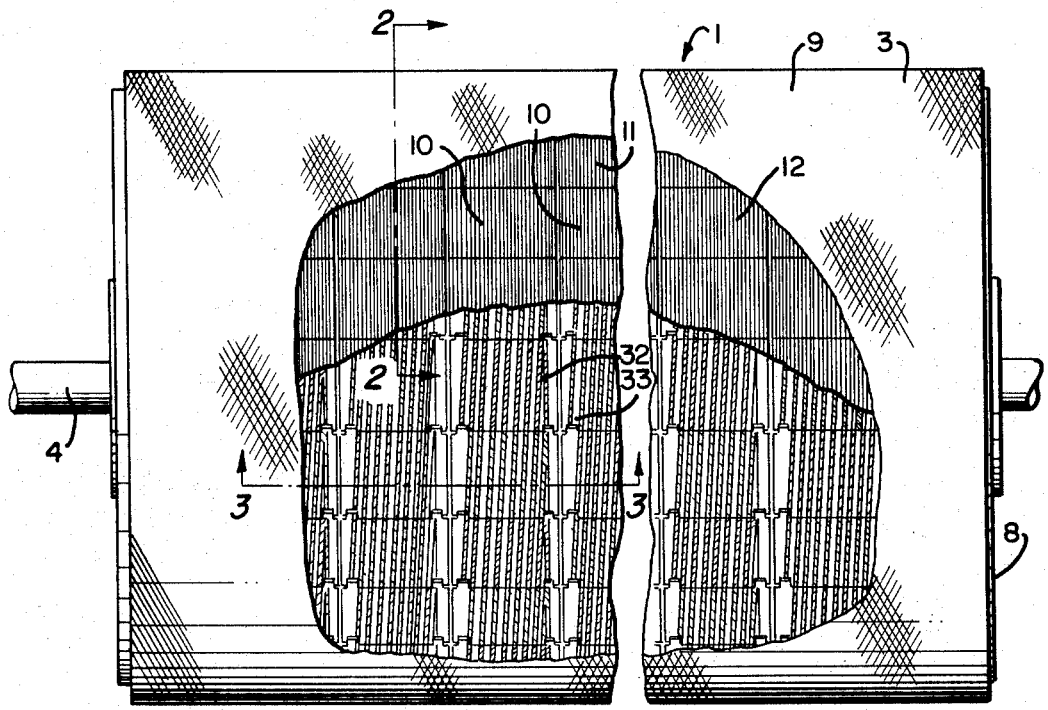
FIG. 1 is a plan view with portions being cut-away of a rotary filter drum embodying the invention.

The drum filter 1 shown in the drawings includes an open-topped vat or tank 2 adapted to hold a liquid slurry of material such as pulp used in the paper manufacturing art. A cylindrical drum 3 is supported in the vat with its lower portion immersed in the slurry in the vat 2. The drum 3 includes a shaft 4 carrying a series of internal axially-spaced spider-shaped frames 5. Each of the spider frames 5 includes a series of spokes 6 extending radially outward from the shaft 4 and a rim 7 carried by the spokes 6. The drum 3 includes a pair of end walls 8, at least one of which is open to allow the filtrate to flow freely from the interior of the drum 3. The circumference of the drum 3 includes a circumferential filter screen 9 supported on and covering a deck composed of a plurality of deck sections or elements 10. The deck sections 10 are supported on the rims 7 of the spider frames 5 and are arranged in a plurality of circumferential rows 11 and axial rows 12, as illustrated in FIG. 1.

Figure 3:
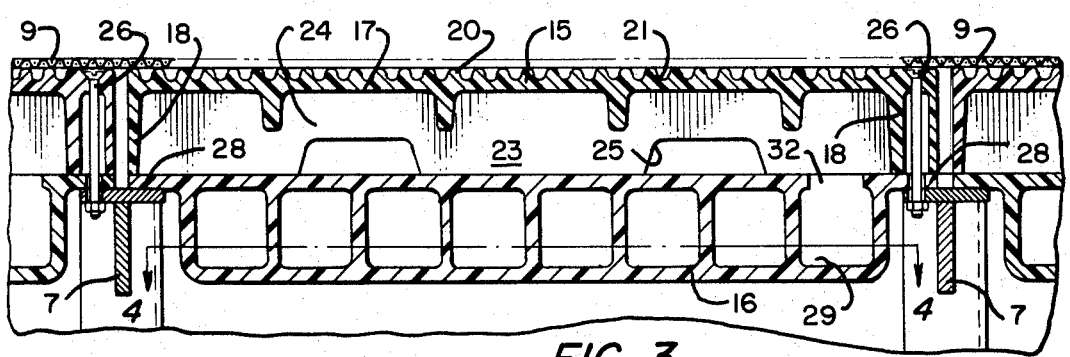
FIG. 3 is a fragmentary enlarged section taken on the line 3—3 of FIG. 1.

Each of the deck sections 10 includes two parts, a top tile 15 which supports and engages the screen 9 and a bottom tile 16 which contains the passageways which create the suction or vacuum. The top tile 15 includes a top plate 17, as shown in FIG. 3, and a pair of sides 18 and ends 19. The sides 18 and ends 19 support the top tile 15 on top of the bottom tile 16. The top plate 17 includes a series of longitudinally spaced ribs 20 on its outer face which support the screen 9 and form drainage grooves 21 located between the ribs 20. The grooves 21 contain ports 22 extending through the top plate 17 for draining filtrate from the grooves 21 into a compartment 23 which is formed under the top tile 15. The top tile 15 includes one or more inner legs 24 extending longitudinally across the compartment 23 to provide additional support for the top plate 17. The inner legs 24 contain notches 25 to allow fluid to pass freely through the inner legs 24. The top tile 15 is attached to the spider frame rims 7 of the drum by several countersunk bolts 26 as shown in FIG. 3.

Each bottom tile 16 includes a pair of flanges 28 extending longitudinally from its opposite sides and arranged to rest on the spider frame rims 7 as shown in FIG. 3. The bottom tile 16 further contains a plurality of parallel conduits extending more or less circumferentially between its ends and providing a plurality of parallel passages 29. The passages 29 extend at a small acute angle relative to the direction of rotation of the drum 3. In one sense, the passages 29 can be considered as extending helically around the circumference of the drum 3. The passages 29 extend helically in order to connect to similar passages in adjacent deck sections 10 to form vacuum-forming passages, each serving individual compartments 23 and extending over a substantial portion of the circumference of the drum 3, say, at least 90 degrees.

Figure 4:
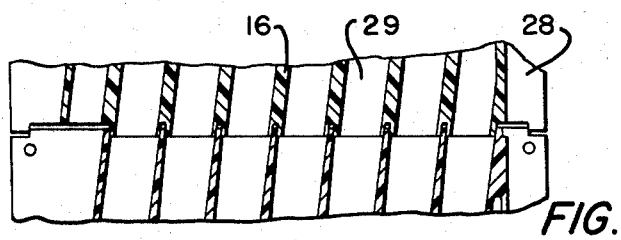
FIG. 4 is a reduced fragmentary section taken on the line 4—4 of FIG. 3, illustrating the joint between adjacent deck sections.

Each of the passages 29 in a bottom tile 16 are coupled to the passages 29 in an adjacent bottom tile 16 by means of a sleeve joint as shown in FIG. 4. In this type of joint, the end of a passage 29 in one bottom tile slidably receives the end of a passage 29 in an adjacent bottom tile. FIG. 6 illustrates how a series of bottom tiles 16 in a circumferential row 11 cooperates to form a vacuum-forming passageway 31 shown in cross-hatching and extending angularly across the series of bottom tiles 16. The forward end of the passageway 31 contains an inlet 32, shown in FIGS. 2, 3, 5 and 6, opening into the compartment 23 above the passageway 31 while the trailing end of the passageway 31 contains an outlet 33 opening into the interior of the drum.

FIG. 6 shows the full length of the passageway 31 from its inlet 32 to its outlet 33. Looking at FIG. 6, the portion of the passageway 31 containing the inlet 32 located in the bottom tile 16′ is connected to the second passage 29″ in the adjacent bottom tile 16″ trailing the tile 16′. The second passage 29″ is measured from the right edge of the bottom tile 16″, looking at FIG. 6. The second passage 29″ is connected to the third passage 29‴ located in the bottom tile 16‴ immediately trailing the bottom tile 16″. In this manner, the passageway 31 continues to extend angularly across the bottom tiles until it reaches the left hand end passage 29 containing the outlet 33. The passageway 31 will extend circumferentially across the number of tiles 16 corresponding to the number of passages 29 contained in a single bottom tile 16. The drawings show eight passages but this number can be varied.

The location of the passages in a side-by-side relationship enables the filter elements or deck sections 10 to be constructed economically and compactly, while providing the drum with vacuum-forming passageway 31 having good hydraulic efficiency. Finally, this invention enables the construction of a valveless drum filter using removable deck sections.

While only a single embodiment of the invention is described and illustrated in detail, this invention is not limited simply to the described embodiment, but contemplates other embodiments and variations which utilize the concepts and teachings of this invention.

I claim:
1. A drum filter of the valveless type comprising:
a drum including a circumferential perforated filter surface for collecting a cake of solid material thereon as it rotates through a liquid slurry;
said drum including a series of circumferentially spaced compartments surrounding the drum and underlying said filter surface for collecting filtrate passing through said filter surface;
each of said compartments being sealed from adjacent compartments so that a vacuum in one compartment will not be affected by leakage from adjacent compartments;
a passage connected to each compartment and extending circumferentially rearward from that compartment over at least one quarter of the circumference of said drum relative to the direction of rotation of the drum to apply a vacuum to said compartment as the compartment rotates upwardly; and
the passages for a series of compartments being nested side-by-side at equal radial distances from the drum axis and extending at an acute angle relative to the direction of rotation of the drum; said drum filter surface being composed of a series of removable drum filter elements attached around the circumference of said drum with each drum filter element forming an individual compartment and portions of a plurality of said passages underlying said compartment.

2. The drum filter of claim 1 wherein:
each of said drum filter elements includes a pair of tiles including a top tile covering said compartment and a bottom tile containing said portions of said passages underlying said compartments.

3. The drum filter of claim 2 wherein:
each bottom tile interfits with adjacent bottom tiles in the circumferential direction to provide a substantially sealed joint between interconnected portions of each passage in adjacent bottom tiles.

4. A rotary drum filter of the valveless type comprising:
a drum including a series of drum filter elements angularly spaced around its circumference;
each drum filter element forming a filtrate drainage compartment and including a series of parallel passages lying under the compartment and extending at an acute angle relative to the direction of rotation of the drum, said passages being located side-by-side at equal radial distances from the axis of said drum with one passage being interconnected to said compartment for draining the compartment; and
said drum filter element being connected to its adjacent drum filter elements so that the compartments in the drum filter elements are sealed from each other and the passages in each drum filter element are connected to the passages in adjacent drum filter elements to form continuing passagesways extending through a series of drum filter elements.

5. The drum filter of claim 4 wherein:
said drum filter element includes a pair of tiles comprising a top tile covering said compartment and a bottom tile containing said passages lying under said compartment.

References Cited

UNITED STATES PATENTS 3,306,457    2/1967    Putnam            210—404 X

FOREIGN PATENTS 756,763    9/1956    Great Britain.

SAMIH N. ZAHARNA, *Primary Examiner.*